United States Patent
Nantz et al.

(10) Patent No.: US 10,737,659 B2
(45) Date of Patent: Aug. 11, 2020

(54) PROTOCOLS FOR REMOTE VEHICLE ACCESS SYSTEMS

(71) Applicant: Huf North America Automotive Parts Manufacturing Corp., Milwaukee, WI (US)

(72) Inventors: John Nantz, Brighton, MI (US); Matthew R. Honkanen, Waterford, MI (US); Yi Luo, Northville, MI (US)

(73) Assignee: Huf North America Automotive Parts Manufacturing Corp., Milwaukee, WI (US)

( * ) Notice: Subject to any disclaimer, the term of this patent is extended or adjusted under 35 U.S.C. 154(b) by 36 days.

(21) Appl. No.: 16/211,326

(22) Filed: Dec. 6, 2018

(65) Prior Publication Data

US 2019/0161059 A1 May 30, 2019

Related U.S. Application Data

(62) Division of application No. 15/039,124, filed as application No. PCT/US2014/068155 on Dec. 2, 2014, now Pat. No. 10,179,567.

(Continued)

(51) Int. Cl.
*B60R 25/24* (2013.01)
*G07C 9/00* (2020.01)

(52) U.S. Cl.
CPC .......... *B60R 25/24* (2013.01); *G07C 9/00309* (2013.01); *G07C 2009/0038* (2013.01);
(Continued)

(58) Field of Classification Search
CPC ......... B60R 25/24; B60R 25/00; B60R 25/25; B60R 25/257; B60R 25/403;
(Continued)

(56) References Cited

U.S. PATENT DOCUMENTS 6,411,887 B1    6/2002  Martens et al.
2005/0237160 A1 10/2005 Nolan et al.
(Continued)

FOREIGN PATENT DOCUMENTS

CN    101165298 A    4/2008
EP    0503695 A1     9/1992
(Continued)

OTHER PUBLICATIONS

State Intellectual Property Office (P.R.C.), Office Action for CN Application No. 201480066014.1, dated Mar. 29, 2018.

(Continued)

*Primary Examiner* — Dionne Pendleton
(74) *Attorney, Agent, or Firm* — Honigman LLP; Matthew H. Szalach; Jonathan P. O'Brien

(57) ABSTRACT

A wireless communications system for an automotive vehicle includes a vehicle control unit and a fob. The vehicle control unit includes a vehicle transceiver. The fob includes a fob transceiver and a fob control unit and is configured to transmit and receive communications through at least two channels. The fob control unit is programmed to transmit a preamble through the first of the at least two channels, transmit a preamble through the second of the at least two channels during a null space following the preamble transmitted through the first channel, transmit a data packet payload through the first channel when a null space following the preamble in the second channel is detected, and transmit a data packet payload through the second channel when a null space following the preamble in the second channel is detected. Communications are interleaved between the first and second channels.

14 Claims, 10 Drawing Sheets

Related U.S. Application Data

(60) Provisional application No. 61/911,216, filed on Dec. 3, 2013.

(52) U.S. Cl.
CPC .............. *G07C 2009/00246* (2013.01); *G07C 2009/00984* (2013.01); *G07C 2209/06* (2013.01)

(58) Field of Classification Search
CPC ........ G07C 9/00309; G07C 2009/0038; G07C 2009/00793; G07C 2209/61; G07C 9/00182; G07C 9/28; G07C 2009/00984; G07C 2209/06; G07C 19/005; H01L 2224/48091; H01L 2924/00014; H01L 2224/48137; B60C 23/0408; B60K 28/063; E05F 15/76; E05F 2015/763; E05F 15/00; E05F 15/668; E05F 15/77; E05F 15/79; E05Y 2900/531; E05Y 2400/50; E05Y 2400/59; E05Y 2400/822; E05Y 2800/00; E05Y 2800/424; E05Y 2900/106; G01N 33/4972; G06K 19/0705; G06K 19/0723; G08C 17/00; G08C 19/32; G08C 2201/63; G08G 1/017; G08G 1/205; G10L 17/22; G10L 17/24; G10L 21/04; H04R 2499/13; H04R 2009/00246; H04B 1/69; H04B 1/71635; H04B 1/71637; H04B 1/719; H04B 1/74; H04L 1/08; H04L 1/189; H04L 29/06; H04L 69/04; H04L 69/08; H04L 69/22; H04W 28/06; H04W 40/246; H04W 40/248; H04W 76/11; H04W 76/15; H04W 88/085
See application file for complete search history.

(56) References Cited

U.S. PATENT DOCUMENTS

| | | |
|---|---|---|
| 2007/0139158 A1 | 6/2007 | Manson et al. |
| 2008/0088409 A1 | 4/2008 | Okada et al. |
| 2010/0123569 A1 | 5/2010 | Okada et al. |
| 2010/0202493 A1* | 8/2010 | Soliman .................. H04B 1/69 375/130 |
| 2012/0092125 A1* | 4/2012 | Farber .................. E05F 15/668 340/5.7 |
| 2013/0033361 A1 | 2/2013 | Lickfelt et al. |
| 2015/0156284 A1* | 6/2015 | Akhter .................. H04L 69/04 370/477 |
| 2016/0272153 A1 | 9/2016 | Ogura et al. |
| 2019/0335379 A1* | 10/2019 | Joseph .................. H04L 1/189 |

FOREIGN PATENT DOCUMENTS

| | | |
|---|---|---|
| EP | 0735219 A2 | 10/1996 |
| WO | WO-2004023418 A1 | 3/2004 |

OTHER PUBLICATIONS

International Searching Authority, International Search Report and Written Opinion for PCT Application No. PCT/US2014/068155, dated Sep. 21, 2015.

United States Patent and Trademark Office, Office Action for U.S. Appl. No. 15/039,124, dated Jan. 22, 2018.

United States Patent and Trademark Office, Office Action for U.S. Appl. No. 15/039,124, dated Sep. 7, 2017.

* cited by examiner

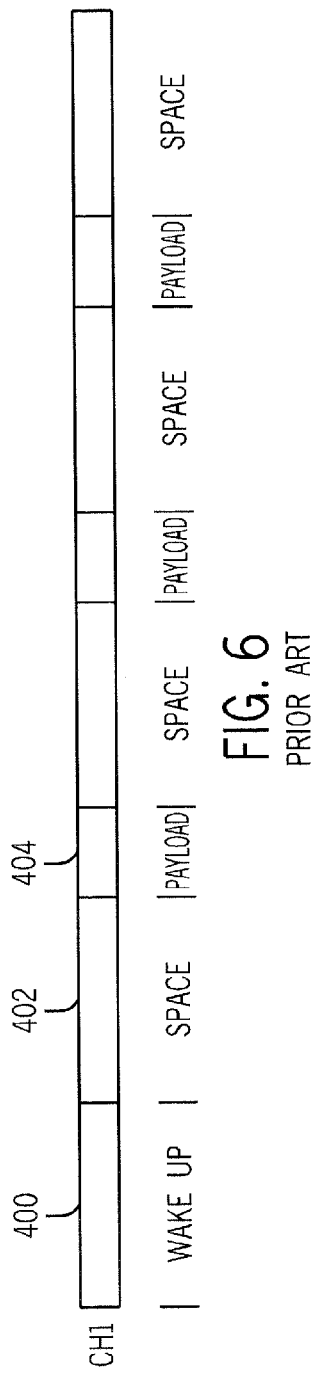
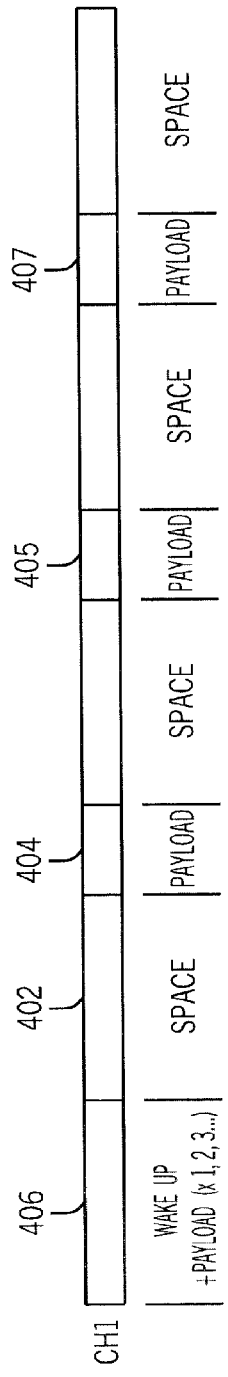
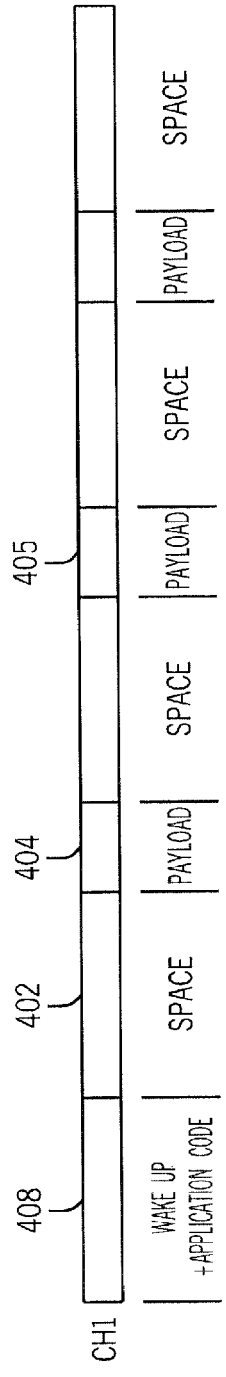

PROTOCOLS FOR REMOTE VEHICLE ACCESS SYSTEMS

CROSS-REFERENCE TO RELATED APPLICATIONS

This application is the divisional application of U.S. application Ser. No. 15/039,124, filed May 25, 2016, which is the national phase of International Application No. PCT/US2014/068155, filed Dec. 2, 2014, which claims the benefit of U.S. Provisional Patent Application No. 61/911,216, filed Dec. 3, 2013, which are hereby incorporated by reference in their entireties.

BACKGROUND OF THE INVENTION

In recent years, wireless communications have become increasingly important in a number of vehicle control systems. Remote vehicle entry transmitters/receivers, for example, are used for locking and unlocking a vehicle door, unlatching a trunk latch, or activating or deactivating an alarm system equipped on the vehicle. This remote entry device is commonly referred to a remote keyless entry (RKE) fob. The RKE fob is typically a small rectangular or oval plastic housing with a plurality of depressible buttons for activating each one of the wireless operations. The RKE fob is carried with the operator of a vehicle and can wirelessly perform these functions when within a predetermined reception range of the vehicle. The RKE fob communicates with an electronic control module within the vehicle via a RF communication signal.

Other communication modules may be provided within the vehicle system. These can include, for example, a tire pressure monitoring (TPM) system. A TPM system disposes pressure sensors on or within vehicle tires to sense the pressure within a respective tire and report low or high pressure conditions to a driver. TPM systems sense tire pressure within a tire and transmit a signal to a body-mounted receiving unit located external to the tire for processing tire pressure data. Interference may occur when the signal transmitted by the transmitting devices of TPM system is broadcast in the same operating frequency of the RKE receiver.

Even more recently, complex embedded electronic systems have become common to provide access and start functions, and to provide wide ranging functions to improve driver safety and convenience. These systems include Passive Entry and Passive Start (PEPS) systems. In PEPS systems, a remote receiver and transmitter (or transceiver) is carried with the user in a portable communication device such as a key fob or a card. The portable communication device when successfully challenged transmits a radio frequency (RF) signal to a module within the vehicle for performing a variety of remote vehicle function such door lock/unlock, enabling engine start, or activating external/internal lighting. Passive entry systems include a transmitter and receiver (or transceiver) in an electronic control module disposed within the vehicle. The transceiver is typically in communication with one or more devices (e.g., door lock mechanism) for determining when a request for actuation of a device is initiated (e.g., lifting a door handle) by a user.

Upon sensing the request for actuation, the transceiver broadcasts a passive entry interrogating signal. The fob upon receiving the interrogating signal from the ECU, the portable communication device determines if the interrogating signal is valid. If it is determined a valid signal, then the fob automatically broadcasts an output signal which includes an encrypted or rolling identification code to the electronic control module. The electronic module thereafter determines the validity of the output signal and generates a signal to the device to perform an operation (e.g., the door lock mechanism to unlock the door) if the output signal is determined valid.

As the number of wireless communication systems and number of wireless controls has increased, it has become increasingly important to assure that communications are fast and efficient. Thus, there exists a need for improved communications systems that can quickly transmit and process wireless communications packets.

SUMMARY OF THE INVENTION

The present disclosure provides a number of wireless protocols for decreasing latency, increasing redundancy, and increasing immunity to interference in transmissions within a vehicle, or between a vehicle and a fob or other personal communication device or token.

In one aspect, the present disclosure describes a wireless communications system for an automotive vehicle comprising a control unit in the automotive vehicle including a transceiver configured to receive signals from a fob, and a fob comprising a transceiver and a control unit, where the fob configured to transmit a wake-up signal to the control unit in the automotive vehicle. A data packet providing commands for commanding the control unit to perform a vehicle function is embedded within the wake-up packet. The data packet can comprise an application code.

In another aspect, a wireless communications system for an automotive vehicle is disclosed comprising a control unit in the automotive vehicle including a transceiver adapted to transmit and receive serial communications in at least two channels, and a fob comprising a transceiver and a control unit, the fob configured to transmit and receive communications through the at least two channels. The control unit in the fob is programmed to transmit a preamble through the first of the at least two channels and to transmit a preamble through the second of the at least two channels during a null space following the preamble transmitted through the first channel. The control unit is further programmed to transmit a data packet payload through the first channel when a null space following the preamble in the second channel is detected, and to transmit a data packet payload through the second channel when a null space following the preamble in the second channel is detected. Communications between the first and second channels are therefore interweaved. The transmission of the payload data packets in each of the first and second channels are spaced variably to improve noise immunity.

In yet another aspect, a wireless communications system for an automotive vehicle is disclosed comprising a control unit in the automotive vehicle including a parallel processing transceiver adapted to transmit and receive communications in a plurality of channels and corresponding sub-channels, and a fob comprising a parallel processing transceiver adapted to transmit and receive communications in a plurality of channels and corresponding sub-channels and a control unit. The fob is configured to transmit and receive communications through the parallel processing channels, and the control unit in the fob is programmed to transmit data packets corresponding to a vehicle function selected by each of a plurality of fobs through corresponding sub channels in a first channel, and transmit the data packets corresponding to each of the plurality of fobs through corresponding sub channels in a second channel.

In still another aspect, a wireless communications system for an automotive vehicle comprises a control unit in the automotive vehicle including a parallel processing transceiver adapted to transmit and receive communications in a plurality of channels and corresponding sub-channels, and a fob comprising a parallel processing transceiver adapted to transmit and receive communications in a plurality of channels and corresponding sub-channels and a control unit. The fob is configured to transmit and receive communications through the parallel processing channels, wherein the control unit in the fob is programmed to transmit data packets corresponding to a vehicle function for each of a plurality of fobs through corresponding sub channels in a first channel, and transmit the data packets corresponding through corresponding sub channels in a second channel.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE DRAWINGS

FIG. 6, illustrates a typical radiofrequency communications protocol between a key fob, tire condition sensor or other vehicle system in communication with the vehicle transceiver.

FIG. 7 illustrates a protocol including a data packet for performing a function such as opening a door that is embedded in the wakeup package.

FIG. 8 is an alternate embodiment of the protocol of FIG. 7, in which an application code is embedded in a wakeup signal and multiple functions are to be performed.

DETAILED DESCRIPTION OF THE INVENTION

Figure 1:
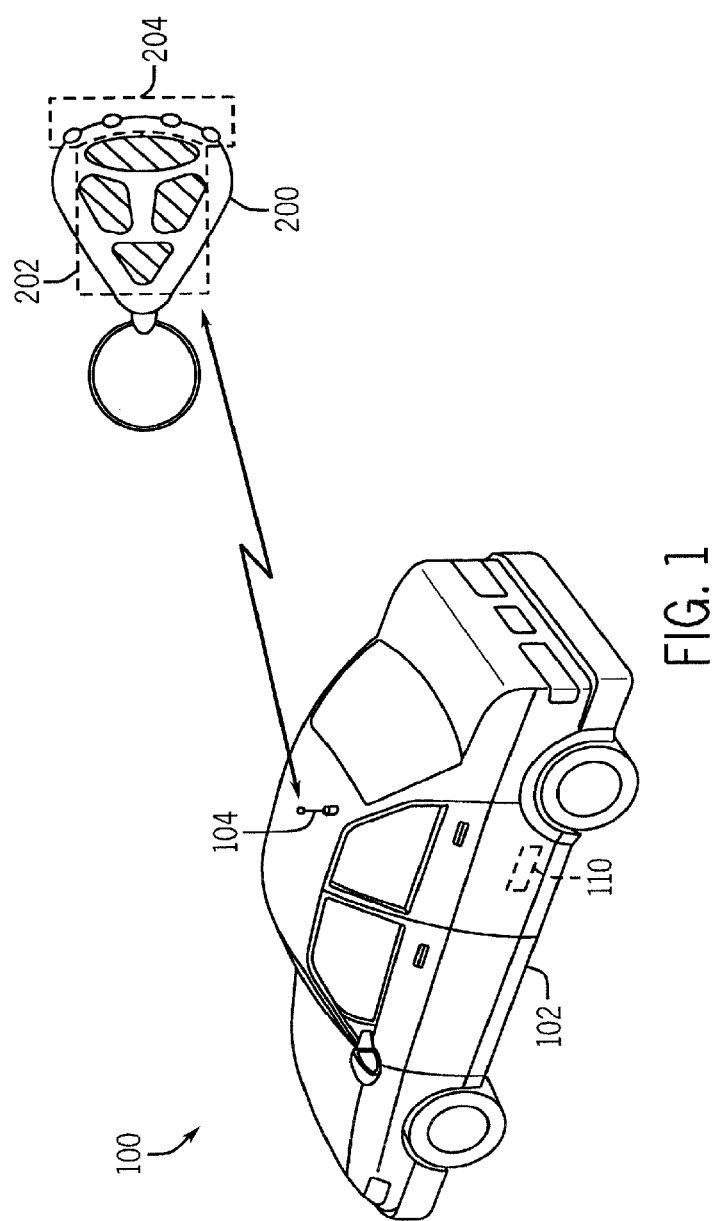
FIG. 1 illustrates a wireless vehicle communication system including a vehicle, vehicle transceiver module, and an antenna communicating with a mobile electronic user device.

Referring to FIG. 1, a wireless vehicle communication system 100 is shown. The system 100 comprises a vehicle 102 including a vehicle transceiver module 110 having an antenna 104 communicating with a mobile electronic user device 200, which here is shown and described as a key fob. It will be apparent that the mobile electronic user device 200 can be many types of application-specific or personal computerized devices, including, for examples, transponder cards, personal digital assistants, tablets, cellular phones, and smart phones. Communications are typically described below as bi-directional between the vehicle transceiver module and the key fob 200 and other devices, although it will be apparent that in many applications one way communications will be sufficient.

The key fob 200 can include one or more user input device 202 and one or more user output or alert devices 204. The user input devices 202 are typically switches such as buttons that are depressed by the user. The user output alert devices 204 can be one or more visual alert, such as light emitting diodes (LEDs), a liquid crystal display (LCD), and audible alarm, or a tactile or vibratory device. A single function can be assigned to each input device 202 or user alert devices 204, or a combination of input devices or a display menu could be used to request a plethora of functions via input device sequences or combinations. Key fobs can, for example, provide commands to start the vehicle, provide passive entry (i.e., automatic unlocking of the doors of the vehicle 102 when key fob 200 is within a predetermined proximate distance of the vehicle 102), activate external and internal vehicle lighting, preparation of the vehicle locking system, activation of a vehicle camera for vehicle action in response to camera-detected events, opening windows, activating internal electric devices, such as radios, telephones, and other devices, and adjustment of driver preferences (e.g., the position of the driver's seat and the tilt of the steering wheel) in response to recognition of the key fob 200. These functions can be activated input devices 202 or automatically by the vehicle 102 detecting the key fob 200. Although a single key fob is shown here, it will be apparent that any number of key fobs could be in communication with the vehicle transceiver module, and the vehicle transceiver module 110 and corresponding control system could associate a different set of parameters with each key fob.

In addition, the vehicle transceiver module 110 can activate output or alert devices 204 to notify the vehicle user that the key fob 200 is within communication distance or some other predetermined distance of the vehicle 102; notify the vehicle user that a vehicle event has occurred (e.g., activation of the vehicle security system), confirm that an instruction has been received from the key fobs 200, or that an action initiated by key fob 200 has been completed.

Figure 2:
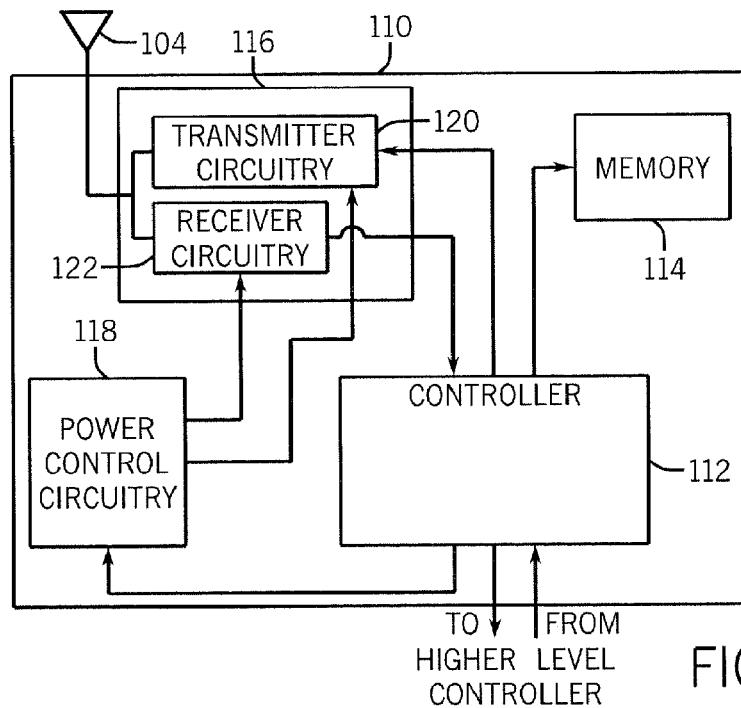
FIG. 2 is a block diagram of an exemplary vehicle transceiver module that can be used in accordance with the disclosed system.

Referring now to FIG. 2, a block diagram of an exemplary vehicle transceiver module 110 that can be used in accordance with the disclosed system is illustrated. The vehicle transceiver module 110 includes a processor or controller 112, memory 114, a power supply 118, and transceiver circuitry 116 communicating through the antenna 104.

The transceiver circuitry 116 includes receiver circuitry 122 and transmitter circuitry 120 for bi-directional communications. The receiver circuitry 122 demodulates and decodes received RF signals from the key fob 200, while the transmitter provides RF codes to the key fob 200, as described below. Although separate transmitters and receivers are shown, one or more transceivers could also be used.

The memory 114 stores data and operational information for use by the processor 112 to perform the functions of the vehicle transceiver module 110, and to provide the vehicle function(s) described above. The controller 112 is also coupled to a higher level vehicle controller or controllers (not shown), which can include, for example, a vehicle bus such as a Controller Area Network (CAN) bus system and corresponding vehicle control system, and can both receive command signals from the vehicle control system and provide command signals and other information to the vehicle control system. Information available to other devices from the CAN bus or other online vehicle bus may include, for example, vehicle status information regarding vehicle systems, such as ignition status, odometer status (distance traveled reading), wheel rotation data (e.g., extent of wheel rotation), etc. Vehicle status data can also include status of electronic control systems including among others, Supplemental Restraint Systems (SRS), Antilock Braking Systems (ABS), Traction Control Systems (TCS), Global Positioning Systems (GPS), Environmental monitoring and control Systems, Engine Control Systems, cellular, Personal Communications System (PCS), and satellite based communication systems and many others not specifically mentioned here.

The transceiver 110 is coupled to the antenna 104 for receiving radio frequency (RF) signals from the key fob 200 and transmitting signals to the key fob 200. Although the antenna 104 is shown as being external to the vehicle transceiver module 110 and on the exterior of the vehicle 102, the antenna 104 may also be implemented within the confines of the vehicle 120 or even within the vehicle transceiver module. A number of antennas can be embedded, for example, in the headliner of a vehicle, or elsewhere within a vehicle. Although a bi-directional transceiver 110 is shown, it will be apparent that one way communications from the key fob 200 to the vehicle 102, or from the vehicle to the key fob 200 can also be provided, and that both a transmitter and receiver would not be required.

Figure 3:
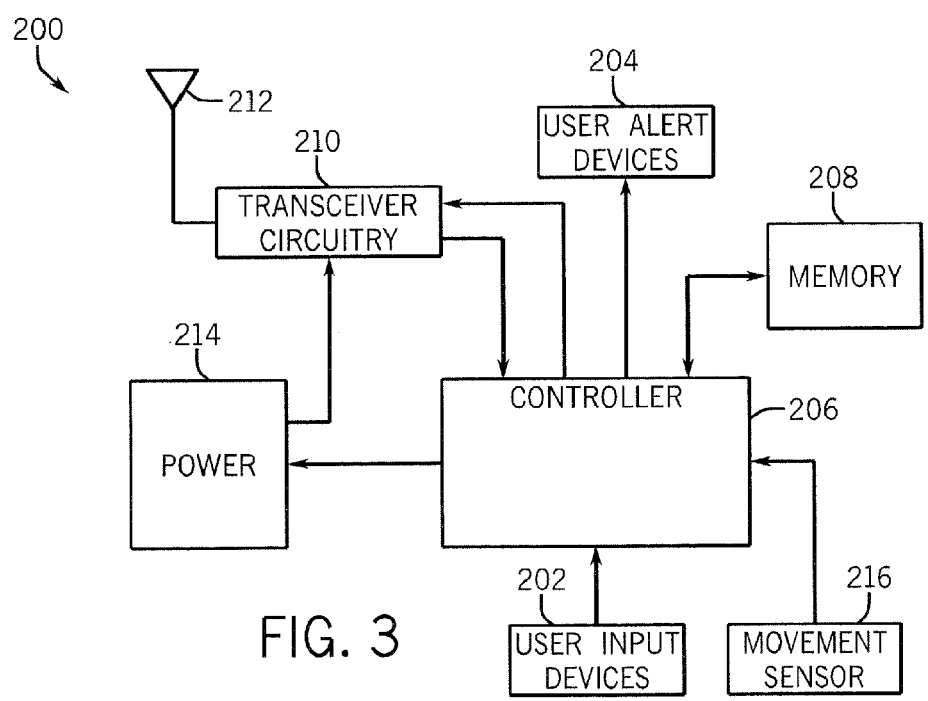
FIG. 3 is a block diagram of an exemplary key fob that can be used in accordance with the disclosed system.

Referring now to FIG. 3, a block diagram of an exemplary key fob 200 that can be used in accordance with the disclosed system includes a controller 206, memory 208, transceiver 210 and corresponding antenna 212, and a power supply 214 (such as a battery). User input devices 202 and user alert devices 204 are in communication with the controller 206. The transceiver circuitry 210 includes receiver circuitry and transmitter circuitry, the receiver circuitry demodulating and decoding received RF signals to derive information and to provide the information to the controller or processor 206 to provide functions requested from the key fob 200. The transmitter circuitry encodes and modulating information from the processor 206 into RF signals for transmission via the antenna 212 to the vehicle transceiver 110.

Although many different types of communications systems could be used, conventional vehicles typically utilize four short-range RF based peer-to-peer wireless systems, including Remote Keyless Entry (RKE), Passive Keyless Entry (PKE), Immobilizer and Tire Pressure Monitoring System (TPMS). RKE and TPMS typically use the same high frequency with different signal modulation (315 MHz for US/NA, 433.32 MHz for Japan and 868 MHz for Europe), whereas the PKE system often requires a bidirectional communication at a low frequency (125 KHz) between the key fob and the receiver module and a unidirectional high frequency communication from key fob to the receiver module. The Immobilizer system also typically uses a low frequency bidirectional communication between the key fob and the receiver module. Receivers for these systems are often standalone and/or reside in various control modules like Body Control Module (BCM) or Smart Junction Block (SJB). By using different radios with different carrier frequencies and/or modulation schemes, collisions between transmissions from separate wireless communication systems in the vehicles can be avoided.

The antenna 212 located within the fob 200 may be configured to transmit long-range ultra-high frequency (UHF) signals to the antenna 104 of the vehicle 100 and receive short-range Low Frequency (LF) signals from the antenna 104. However, separate antennas may also be included within the fob 200 to transmit the UHF signal and receive the LF signal. In addition, antenna 104 and other antennas in the vehicle may be configured to transmit LF signals to the fob 200 and receive UHF signals from the antenna 212 of the fob 200. Also, separate antennas may be included within the vehicle 102 to transmit LF signals to the fob 200 and receive the UHF signal from the fob 2200

The fob 200 may also be configured so that the fob controller 206 may be capable of switching between one or more UHF channels. As such, the fob controller 206 may be capable of transmitting a response signal across multiple UHF channels. By transmitting the response signal across multiple UHF channels, the fob controller 206 may ensure accurate communication between the fob 200 and the vehicle transceiver 110.

Referring still to FIG. 3, a motion detection device, such as a movement sensor 216, can optionally be included in the key fob 200 to detect movement of the key fob 200. The controller 206 can, for example, utilize the motion or lack of motion detected signal from the movement sensor 216 to place the key fob 200 in a sleep mode when no motion is detected for a predetermined time period. The predetermined time period during which no motion is detected that could trigger the sleep mode could be a predetermined period of time or a software configurable value. Although the motion detection device is here shown as part of the key fob, a motion detection device could additionally or alternatively be provided in the vehicle 102.

The vehicle transceiver 110 may transmit one or more signals without an operator activating a switch or pushbutton on the fob key 200, including a wakeup signal intended to activate a corresponding fob 200. The fob 200 may receive signals from the transceiver 110 and determine the strength or intensity of the signals (Received Signal Strength Indication (RSSI)), which can be used to determine a location of the fob 200.

Figure 4:
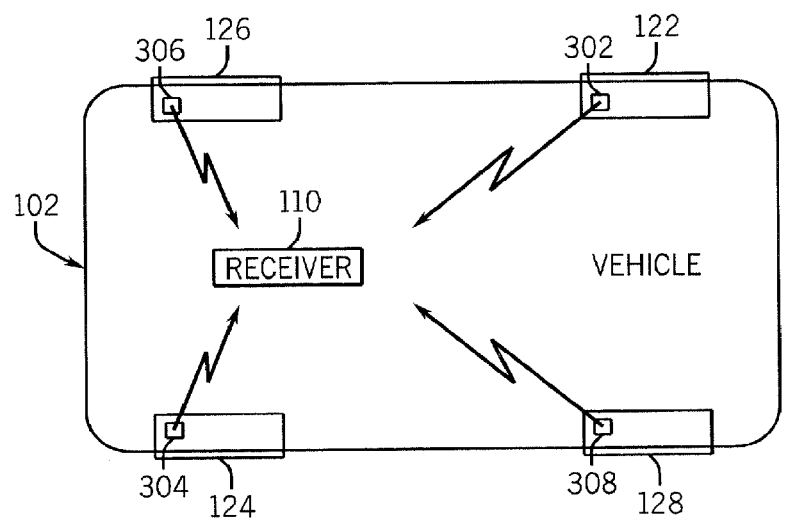
FIG. 4 is a simplified bottom view of a vehicle having four tires and corresponding tire condition monitors.
Figure 5:
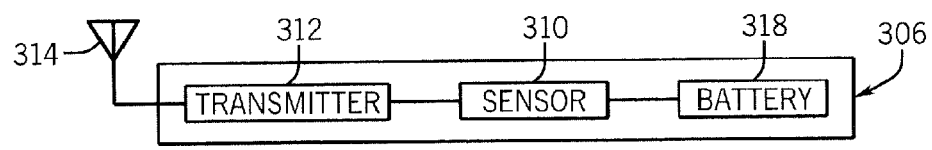
FIG. 5 is a block diagram of a tire condition monitor.

Referring now to FIG. 4, an exemplary vehicle 102 typically includes 4 tires 122, 124, 126, and 128 and an associated tire condition monitor 302, 304, 306, and 308, respectively, for sensing a condition of the tire. The tire condition may be, for example, the gas pressure within the tire, the temperature of tire, both the pressure and temperature, or other tire condition. Referring now also to FIG. 5, by way of example, a tire condition monitor 302 is illustrated schematically and is representative of each of the other tire condition monitors 304, 306, and 308. As shown in FIG. 5, each tire condition monitor 302, 304, 306 and 38 includes a sensor 310 for sensing the gas pressure or temperature in the associated tire. The tire condition monitor 302 may also include additional sensors to sense other tire parameters.

Tire condition monitor 302 also includes a transmitter 312 in communication with the sensor 310. Transmitter 312 is coupled to an antenna 314 to transmit signals that are indicative of the tire condition sensed by the sensor 310. The tire pressure monitor 302 further includes a power supply, such as battery 318, which provides power to at least the transmitter 312. The tire pressure signals may include information or a signal or a message packet portion representative of the status of the battery 318, including a low battery status. The tire condition signals are transmitted to the vehicle transceiver 110, and are preferably radio frequency ("RF") signals of the type discussed above, although other signal types known in the art could be employed. The tire pressure signals may be modulated in any fashion known in the art, such as by Amplitude Shift Keying ("ASK") or Frequency Shift Keying ("FSK"). transmitted together or separately. The tire pressure signals 34 may also include information regarding other tire parameters, such as temperature.

Wakeup

Referring now to FIG. 6, in typical systems, RF communications between the key fob 200, tire condition sensor 302, 304, 306, 308 or other vehicle system in communication with the vehicle transceiver 110 begins with a wakeup signal 400, followed by a space 402, and then a payload 404. Upon receipt of a wakeup signal 400, the vehicle transceiver 110 may or may not transmit a response signal. The vehicle controller 112 may also begin an authentication/response challenge sequence between the vehicle controller 112 and the fob 200. Typical wake up packets are redundant tones with no additional information. This typical architecture therefore leads latency because the wake up packet must be received and verified before the functionality of the data packet can be determined. There can be a significant delay between requesting a function (open doors, activate lights, receive a tire condition update, etc.), and the performance of the function. Because of the increased response times, these delays can be particularly undesirable in vehicles that include multiple systems with multiple wireless functions.

Referring now to FIGS. 7 and 8, embodiments of the present invention embed a payload package providing data or application code necessary to perform a function within the wake up packet. The embedded data packets provide a number of advantages. By providing additional information in the wake up packet, the data packet can be received by the vehicle controller 112 earlier in the transmission, and can also be received repeatedly early in the process. The vehicle controller therefore can determine the function and perform the function more quickly. Processing will occur at an earlier time reducing the overall latency. Furthermore, if multiple vehicle functions use similar wake up packets, application code may be embedded with or without a payload data packer to identify the payload data that is to be processed.

Referring first to FIG. 7, in one embodiment, a data packet for performing a single function such as opening a door can be embedded in the wakeup package 406. Wakeup packet 406 is followed by a null transmission 402. Subsequently, a second payload package 404 is transmitted. Additional payload packets 405 and 407 follow. The vehicle transceiver 110 therefore receives a functional data packet command initially in the wakeup packet, reducing latency, and quickly receives a second data packet, providing a redundant transmission that assures appropriate activation quickly.

Referring now to FIG. 8, in an alternate embodiment, an application code can be embedded in the wakeup signal 408 where multiple functions are to be performed. For example, an application code can be used to provide a signal to personalize a vehicle for a user. Here, for example, the signal can indicate a seat, steering wheel, and mirror adjustment to a predetermined setting for the identified user. Each of the following payload packages 404, 405, 407, can provide the data for the seat location, steering wheel adjustment, and mirror adjustment, respectively. In an alternate embodiment where multiple vehicle functions us similar wakeup packets, an application code is embedded within the wake up packet to identify different functional payload data to follow. Thus, for example, the application code can indicate that the first payload 404 is a door opening data packet, while the second 405 contains vehicle monitoring data, such as a TPM packet.

Interweave Techniques

Figure 9:
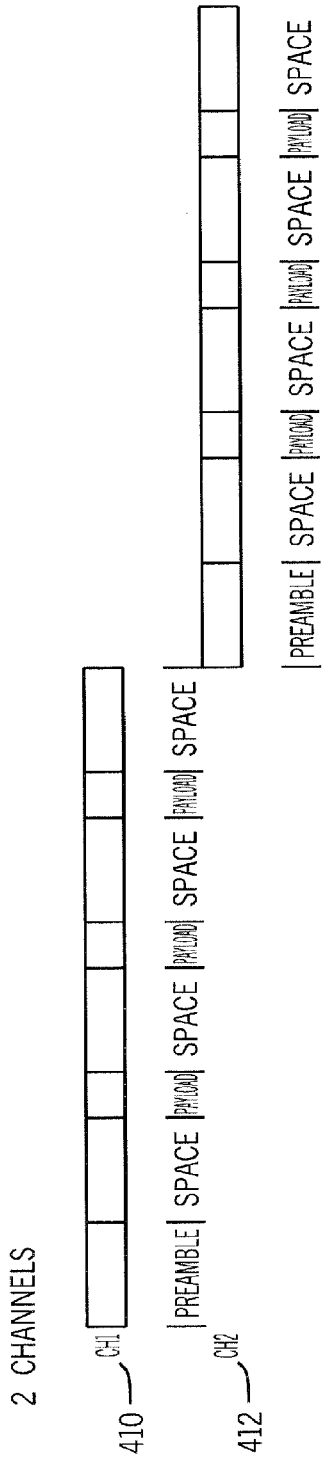
FIG. 9 illustrates a typical prior art two-channel protocol architecture used in wireless communications between a vehicle transceiver and a key fob or other wireless communications device.

Referring now to FIG. 9, a typical two-channel protocol architecture used in wireless communications between a vehicle transceiver 110 and a key fob 200 or other wireless communications device is shown. Here, wireless transmission of one channel or spectrum 410 is followed by wireless transmission of a second channel or spectrum 412, resulting in frequency-time voids or spectrum holes.

Figure 10:
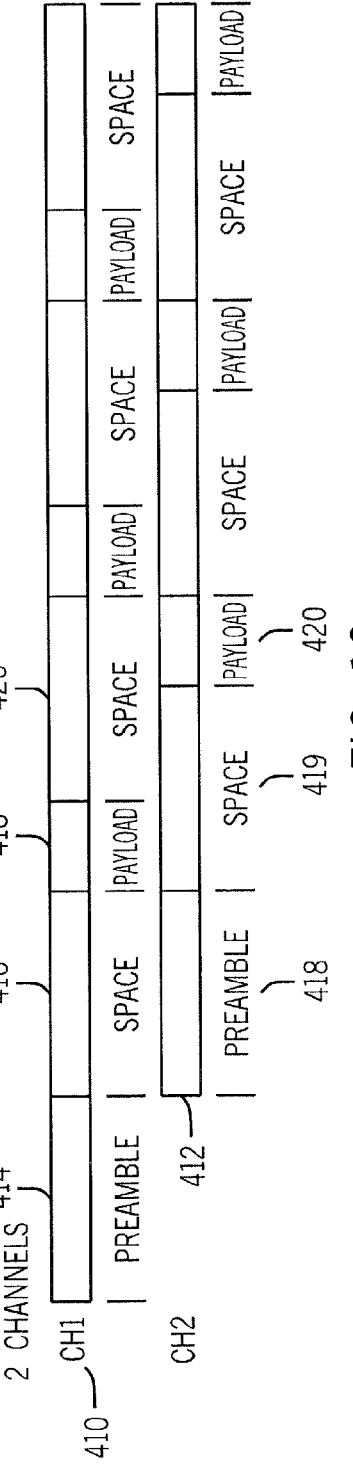
FIG. 10 illustrates an interweave protocol.

Referring now to FIG. 10, a first interweave protocol is shown. Here, a transmission is initially begun in a first channel 410. This transmission begins with a preamble 414, followed by a null space 415 where no transmission occurs, which is then followed by a payload 420 transmitting a data packet or application code. A second transmission begins on a second channel 412 when the preamble of the first transmission ends at time 416, the second channel 412 sending a preamble transmission 418 during the null space 415 in the transmission of channel 1. The first payload packet 420 transmitted in the first channel 410 is transmitted during the null space 419 following the preamble 418 in the second channel 412. Subsequent payloads from the first and second channels are transmitted during null periods in the opposite channel, resulting in an improved use of bandwidth. This technique maximizes use of the spectrum, and also reduces latency in the system by providing the second telegrammed packet to be transmitted at an earlier time slot. This reduced latency can be applied to a single function or multiple functions.

Figure 11:
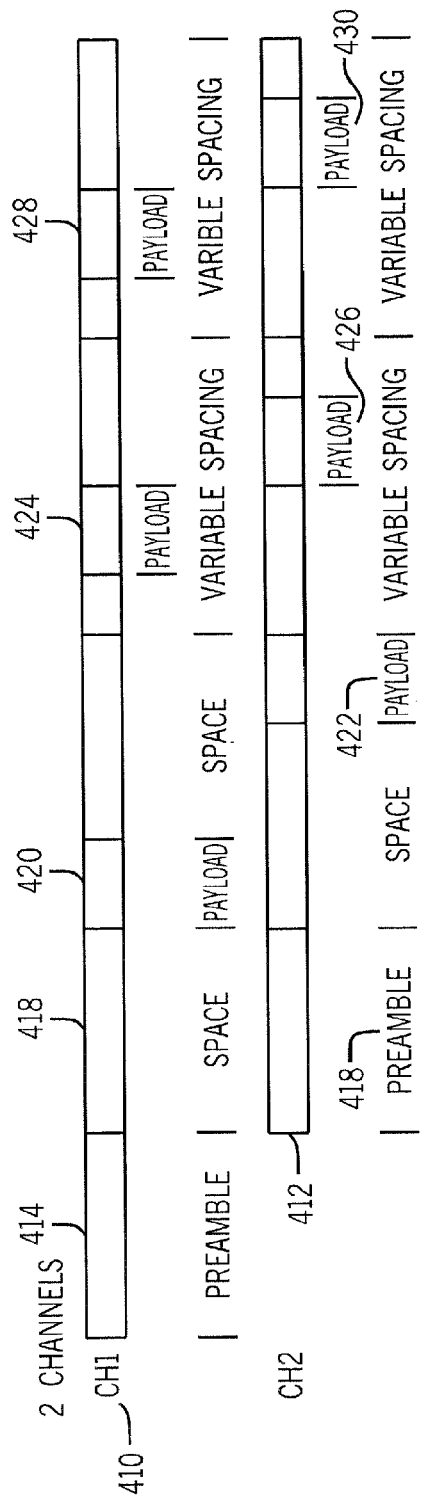
FIG. 11 illustrates an alternative interweave protocol.

Referring now to FIG. 11, a second embodiment of an interweave protocol is shown. Here, as described above with reference to FIG. 10, the preamble 418 sent through the second channel 412 occurs during a null 415 in the first channel 410. Here, the timing of transmission of the payloads 420, 424, and 428 in the first channel 410 occur during null spaces in the second channel 412. Similarly, payloads 422, 426, and 430 transmitted through the second channel 412 occur during null spaces in the first channel 410. Here, the transmission times of the payloads are varied during the null space such that payloads are randomly interspersed. Additionally, the timing of the transmissions during the null regions can be randomized to help increase noise immunity. For example, when two vehicles operating on the same frequency are near or adjacent one another, the transmissions can interfere. The randomized transmission can help to avoid interference, and preventing jamming between adjacent or closely-spaced vehicles.

Parallel Processing

Figure 12:
FIG. 12 illustrates a typical prior art series data process.

Referring now to FIG. 12, prior art wireless processing of data is typically performed in series, Here, a channel is assigned to each wireless access (e.g. a key fob or other personal communicator) or diagnostic device (a tire condition sensor, vehicle status sensor, or individual module status sensor), and to each function associated with each channel. Therefore, for example, a key fob 200 (FIG. 1) having a first actuator 202a for locking doors and a second actuator 202b for unlocking doors will communicate serially over two separate channels. The first channel will be used to communicate instructions to lock the doors, and the second channel to unlock the doors.

Figure 13:
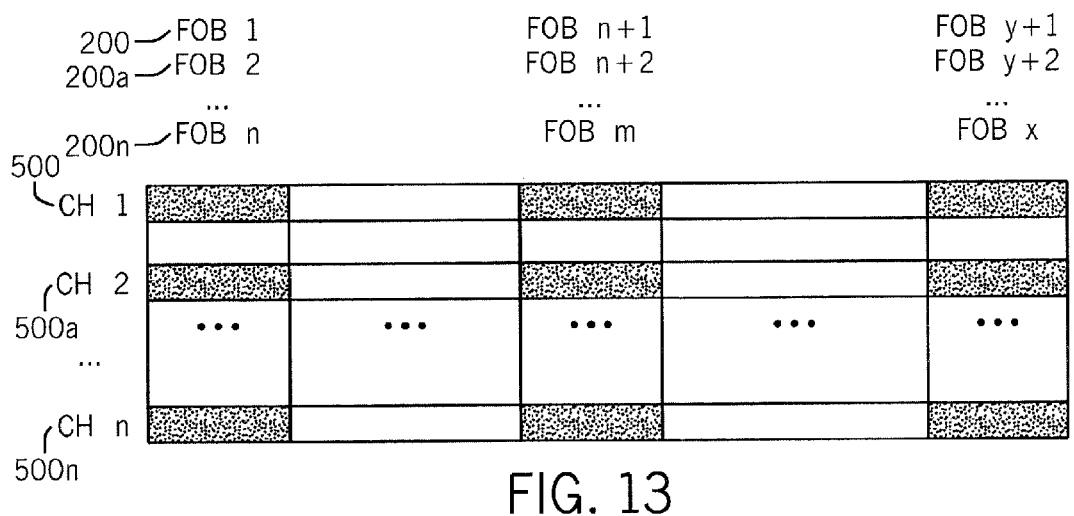
FIG. 13 illustrates a first embodiment of a parallel wireless communications.

Referring again to FIG. 2, to provide parallel processing of data, the transceiver circuitry 210 in the fob 200 and the transceiver circuitry 120/122 in the vehicle control system 110 can be provided by a NCK2983 from NXP corporation located in Nijmegen, Netherlands. Referring first to FIG. 13, one method for providing parallel processing is shown. Here each communication channel 500, 500a . . . 500n is divided into sub-channels of data each corresponding to a key fob 200, 200a . . . 200n expected to provide command data to the vehicle 102. As a result, communications can be processed in parallel, reducing time lags in data communications.

Figure 14:
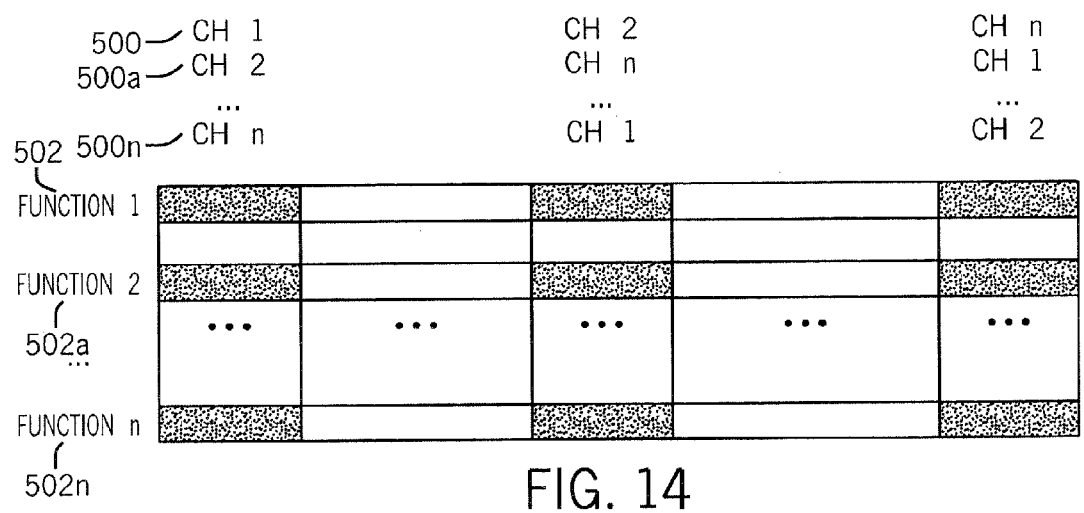
FIG. 14 illustrates a second embodiment of a parallel wireless communications.

Referring now to FIG. 14, in an alternate embodiment, each channel 500, 500a . . . 500n is divided into sub-channels of data based on command functions expected to be received from a fob 200 or other vehicle control system. Thus, for example, in the first transmission, a selected function, e.g. the "door open" function is transmitted to each channel 500. Subsequently, the same information is transmitted to each channel, starting with channel 500a. Data is therefore transmitted redundantly and on different sub-channels, increasing the speed and integrity of the transmission.

Figure 15:
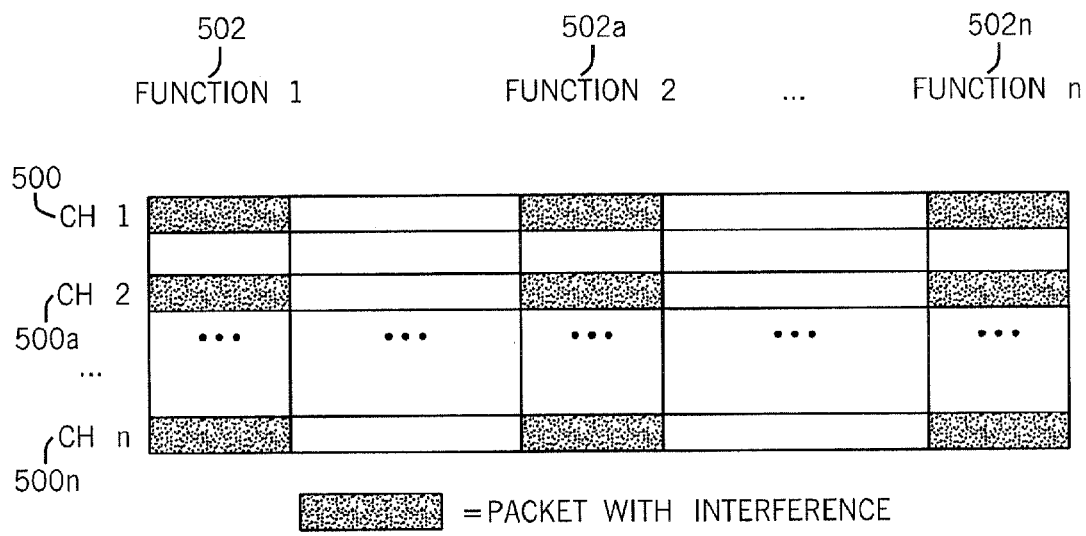
FIG. 15 illustrates a third embodiment of a parallel wireless communications.

Referring now to FIG. 15, in another embodiment using parallel processing, commands for a single function 502, 502a . . . 502n are provided repetitively in a number of sub-channels corresponding to a selected channel 500, 500a . . . 500n. This embodiment is particularly useful in situations where vehicles are adjacent other vehicles that may be transmitting in the same frequency ranges.

Figure 16:
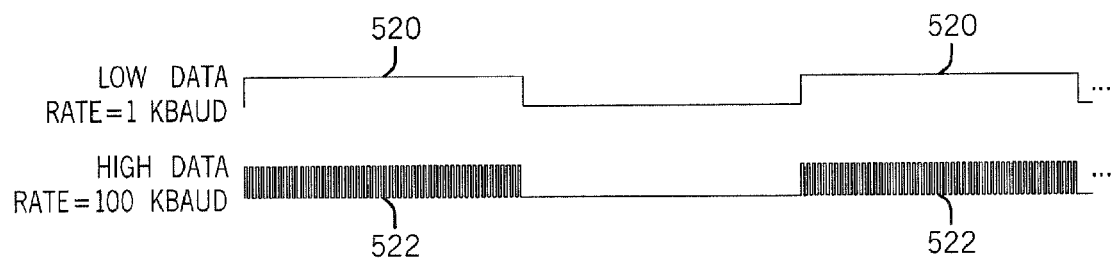
FIG. 16 illustrates a fourth embodiment of a parallel wireless communications.

Referring now to FIG. 16, in another embodiment using parallel processing, a full data packet 522 at high data rate is embedded within the "on" time boundary 520 of a single bit transmitted at a much slower data rate. Embedding a full data packet 522 reduces latency in the communications system by providing additional telegrammed packets to be transmitted at an earlier time slot. The full data packet 522 can transmit a single function or multiple functions. If multiple functions are to be carried out, application code can be used with or without the additional payloads to provide information to the system regarding how to process the incoming data. The additional payloads decrease latency, and offer informational redundancy, therefore increasing the likelihood that the message will be processed correctly and quickly.

Motion Detection

Figure 17:
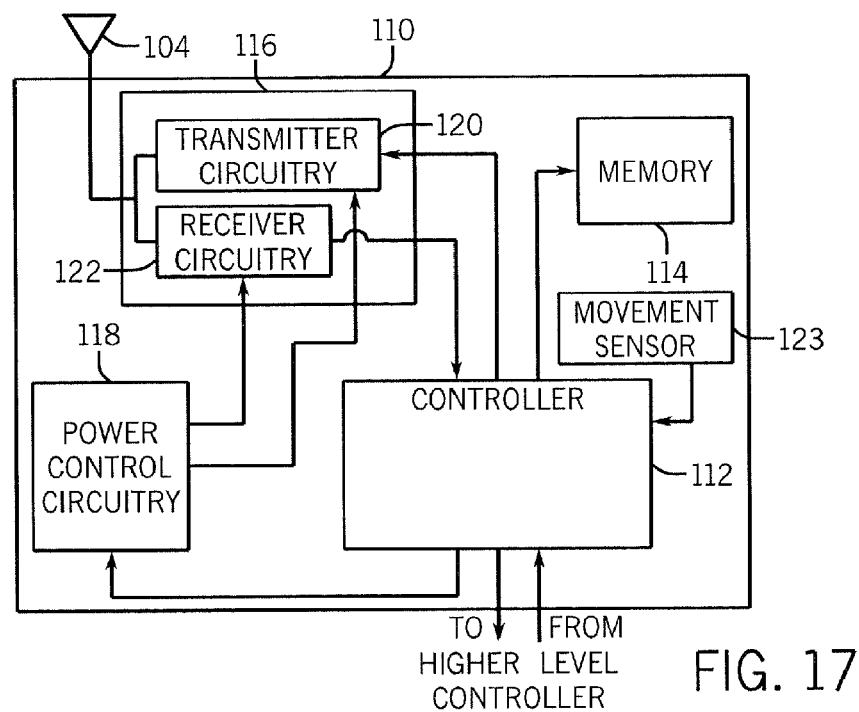
FIG. 17 illustrates an alternate embodiment of a vehicle transceiver.
Figure 18:
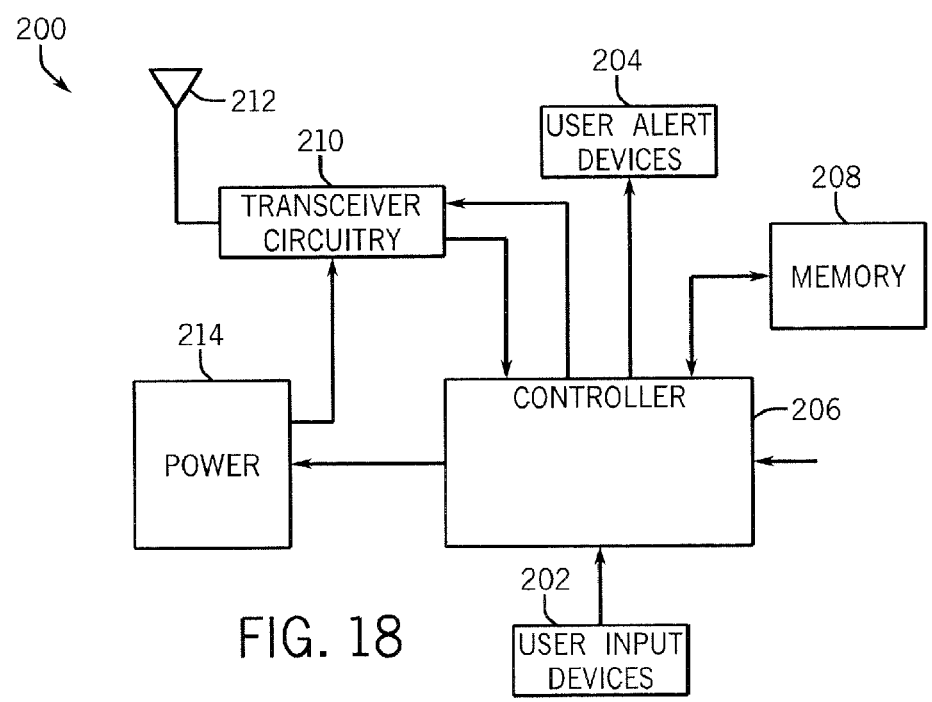
FIG. 18 illustrates an alternate embodiment of a key fob 200 corresponding to the vehicle transceiver of FIG. 17.
Figure 19:
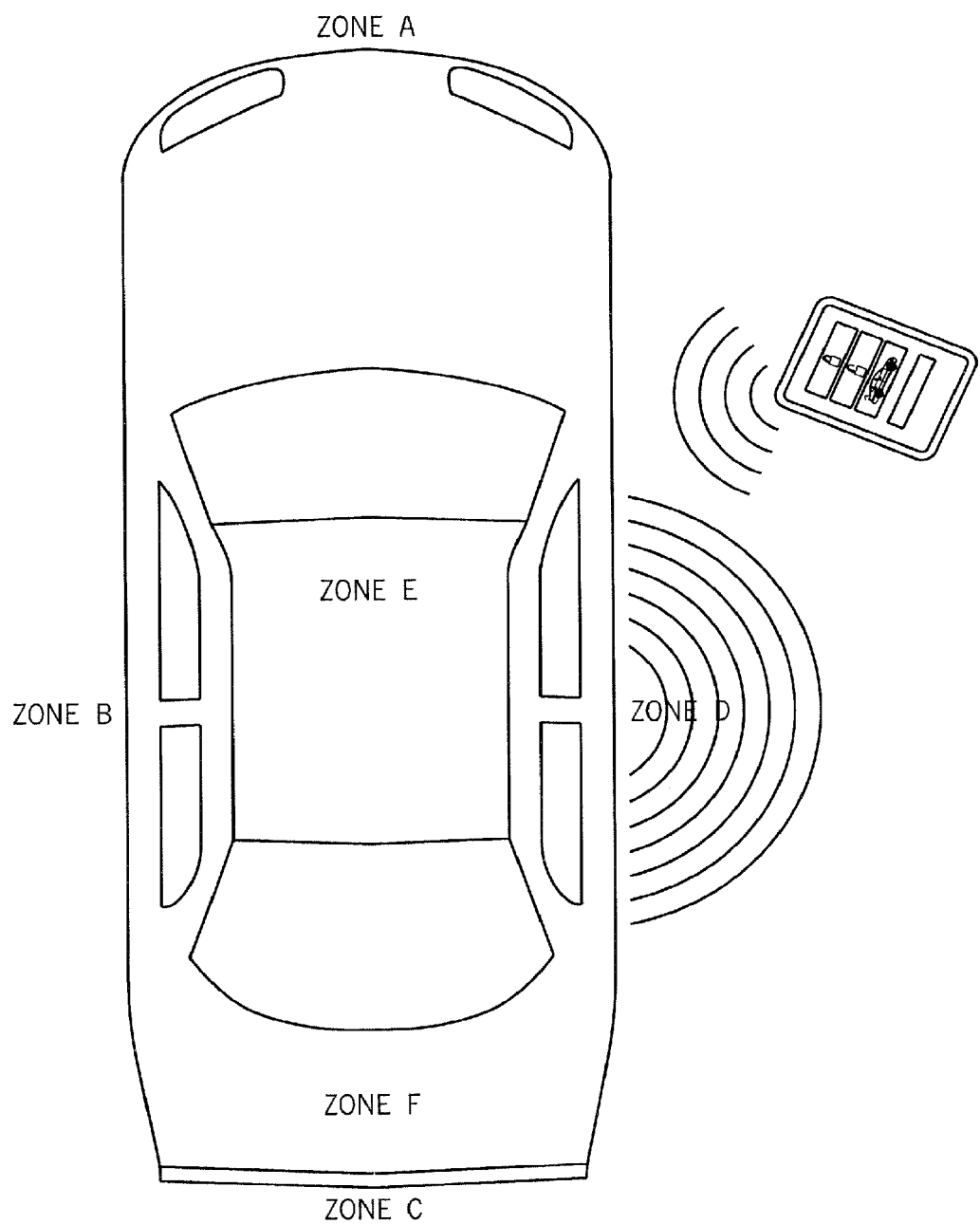
FIG. 19 illustrates a vehicle and corresponding zones of detection.

Referring now to FIGS. 17 and 18 an alternate embodiment of a vehicle transceiver 110 and corresponding key fob 200 is shown, with like numerals indicating like elements of those shown in FIGS. 2 and 3. Here, the vehicle transceiver 110 includes a motion detector 123 that is in communication with the controller 112. The motion detector 123 senses an approaching individual using Doppler, ultrasonic detection, or other motion sensing devices. When motion is detected, the vehicle transceiver 110 begins transmitting a LF polling signal to determine whether a fob 200 is in the area. The receiver 210 in the key fob is either retained in an "on" position, or is programmed to poll to receive the LF command transmitted from the controller 112, and to respond wirelessly in a high frequency MHz, GHz range. When the vehicle transceiver 110 detects the fob, it determines which zone (A, B, C, D, E, F, FIG. 19) the fob 200 is in.

Although specific embodiments are described above, it will be apparent to those of ordinary skill that a number of variations can be made within the scope of the disclosure For example, although bidirectional communications between the vehicle and remote control, passive entry, and sensor devices is shown and described, one-way communications can also be used. It should be understood, therefore, that the methods and apparatuses described above are only exemplary and do not limit the scope of the invention, and that various modifications could be made by those skilled in the art that would fall within the scope of the invention. To apprise the public of the scope of this invention, the following claims are made:

What is claimed is:

1. A wireless communications system for an automotive vehicle comprising:
a vehicle control unit in the automotive vehicle including a vehicle transceiver adapted to transmit and receive serial communications in at least two channels; and
a fob comprising a fob transceiver and a fob control unit, the fob configured to transmit and receive communications through the at least two channels, and wherein the fob control unit is programmed to:
transmit a preamble through a first channel of the at least two channels;
transmit a preamble through a second channel of the at least two channels during a null space following the preamble transmitted through the first channel;
transmit a data packet payload through the first channel when a null space following the preamble in the second channel is detected; and
transmit a data packet payload through the second channel when a null space following the preamble in the second channel is detected, wherein communications are interleaved between the first and second channels.

2. The wireless communications system of claim 1, wherein the transmission of the data packet payloads in each of the first and second channels are spaced variably to improve noise immunity.

3. The wireless communications system of claim 1, wherein the fob control unit is programmed to randomly intersperse the data packet payload transmitted through the first channel and the data packet payload transmitted through the second channel over a transmission time.

4. The wireless communications system of claim 1, wherein the fob control unit is programmed to randomize a timing of (i) the transmission of the data packet payload through the first channel when the null space following the preamble in the second channel is detected and (ii) the transmission of the data packet payload through the second channel when the null space following the preamble in the second channel is detected.

5. The wireless communications system of claim 1, wherein the fob control unit is programmed such that the transmission of the data packet payload through the first channel overlaps the null space following the preamble in the second channel.

6. The wireless communications system of claim 5, wherein the fob control unit is programmed such that the null space following the preamble in the second channel overlaps a null space following the data packet payload through the first channel.

7. The wireless communications system of claim 6, wherein the fob control unit is programmed such that the transmission of the data packet payload through the second channel overlaps the null space following the data packet payload through the first channel.

8. A method of wirelessly communicating between a fob and an automotive vehicle including a transceiver adapted to transmit and receive serial communications in a first channel and a second channel, the method comprising:
  transmitting a first preamble through the first channel;
  transmitting a second preamble through the second channel during a first null space following the first preamble in the first channel;
  transmitting a first data packet payload through the first channel when a second null space following the second preamble in the second channel is detected; and
  transmitting a second data packet payload through the second channel following the second null space in the second channel, wherein communications are interleaved between the first and second channels.

9. The method of claim 8, wherein the transmission of the first and second data packet payloads in each of the first and second channels are spaced variably to improve noise immunity.

10. The method of claim 8, wherein the first and second data packet payloads transmitted through the first and second channels, respectively, are randomly interspersed over a transmission time.

11. The method of claim 8, wherein a timing of the transmission of the first data packet payload through the first channel and a timing of the transmission of the second data packet payload through the second channel is randomized.

12. The method of claim 8, wherein the first data packet payload is transmitted through the first channel during the second null space in the second channel.

13. The method of claim 12, wherein the second data packet payload is transmitted through the second channel during a third null space following transmission of the first data packet payload through the first channel.

14. The method of claim 13, wherein the second null space following the second preamble in the second channel overlaps the third null space following the first data packet payload through the first channel.

\* \* \* \* \*